US012723708B2

(12) United States Patent
Maves

(10) Patent No.: US 12,723,708 B2
(45) Date of Patent: Sep. 1, 2026

(54) DISPLAY MOUNT WITH ADJUSTABLE WALL ATTACHMENT

(71) Applicant: Legrand AV Inc., Eden Prairie, MN (US)

(72) Inventor: Adam Maves, Eden Prairie, MN (US)

(73) Assignee: Legrand AV Inc., Minnetonka, MN (US)

( * ) Notice: Subject to any disclaimer, the term of this patent is extended or adjusted under 35 U.S.C. 154(b) by 0 days.

(21) Appl. No.: 18/719,662

(22) PCT Filed: Dec. 13, 2022

(86) PCT No.: PCT/US2022/052748

§ 371 (c)(1),
(2) Date: Jun. 13, 2024

(87) PCT Pub. No.: WO2023/114234

PCT Pub. Date: Jun. 22, 2023

(65) Prior Publication Data

US 2025/0052364 A1 Feb. 13, 2025

Related U.S. Application Data

(60) Provisional application No. 63/288,844, filed on Dec. 13, 2021.

(51) Int. Cl.

| | |
|---|---|
| ***F16M 13/02*** | (2006.01) |
| ***F16M 11/10*** | (2006.01) |
| ***F16M 11/20*** | (2006.01) |

(52) U.S. Cl.
CPC ............ *F16M 13/02* (2013.01); *F16M 11/10* (2013.01); *F16M 11/2092* (2013.01); *F16M 2200/022* (2013.01)

(58) Field of Classification Search
CPC .... F16M 13/02; F16M 11/10; F16M 11/2092; F16M 2200/022; F16M 11/2014
(Continued)

(56) References Cited

U.S. PATENT DOCUMENTS 5,165,644 A * 11/1992 Allen ..................... F16M 11/08 248/924
6,905,101 B1 * 6/2005 Dittmer .................. F16M 11/10 248/125.7

(Continued)

FOREIGN PATENT DOCUMENTS

CN 209762661 U 12/2019
CN 212226617 U 12/2020

(Continued)

OTHER PUBLICATIONS

International Search Report for PCT/US2022/052748, mailed Apr. 25, 2023 (3 pgs).

(Continued)

*Primary Examiner* — Taylor Morris
(74) *Attorney, Agent, or Firm* — Bradley J. Thorson; DeWitt LLP

(57) ABSTRACT

A mount for attaching a flat panel television to a wall includes a pair of wall attachment brackets, each wall attachment bracket defining a pair of vertically spaced-apart apertures, a pair of cross bars, each cross bar received through a separate one of the apertures in each wall attachment bracket such that the cross bars are vertically spaced apart and parallel to each other, the cross bars being selectively horizontally slidable in the apertures, an arm coupling assembly operably coupling the cross bars, at least one pivotable arm coupled to the arm coupling assembly, and a display interface operably coupled to the arm. The wall attachment brackets can be secured to wall studs at any spacing the wall studs may happen to have, and the cross- (Continued)

bars can slide in the apertures of the wall attachment brackets to position the arm attachment assembly and arm where desired.

20 Claims, 12 Drawing Sheets

(58) Field of Classification Search
USPC ............................................... 248/276.1, 920
See application file for complete search history.

(56) References Cited

U.S. PATENT DOCUMENTS

| | | | | |
|---|---|---|---|---|
| 7,048,242 | B2 * | 5/2006 | Oddsen, Jr. | F16M 11/24 248/917 |
| D539,127 | S * | 3/2007 | Ly Hau | D8/373 |
| 7,448,584 | B2 * | 11/2008 | Chen | F16M 13/02 248/920 |
| 7,487,943 | B1 * | 2/2009 | Gillespie | F16M 11/10 248/920 |
| 7,510,156 | B1 * | 3/2009 | Yaeger | F16M 11/10 248/201 |
| 7,513,469 | B1 * | 4/2009 | Ciungan | F16M 11/10 248/161 |
| 7,793,903 | B2 * | 9/2010 | Dittmer | F16M 13/02 248/281.11 |
| 7,832,700 | B2 * | 11/2010 | Ciungan | F16M 11/2085 248/281.11 |
| D634,328 | S * | 3/2011 | Grey | D14/452 |
| 7,954,780 | B2 * | 6/2011 | Dittmer | F16M 11/10 248/299.1 |
| 7,963,489 | B2 * | 6/2011 | O'Keene | F16M 11/10 248/924 |
| 8,100,372 | B2 * | 1/2012 | Vlies | F16M 13/025 248/278.1 |
| 8,235,342 | B2 * | 8/2012 | Pfister | F16M 11/10 248/920 |
| 8,245,990 | B2 * | 8/2012 | Huang | F16M 13/02 248/920 |
| 9,004,430 | B2 * | 4/2015 | Conner | H04N 5/655 248/920 |
| 9,121,543 | B2 * | 9/2015 | Dittmer | F16M 13/02 |
| 9,383,060 | B2 * | 7/2016 | Geier | F16M 13/02 |
| 9,829,033 | B2 * | 11/2017 | Linder | F16B 2/10 |
| 10,010,177 | B1 * | 7/2018 | Pei | F16M 13/02 |
| 10,104,963 | B2 * | 10/2018 | Brandt | A47B 81/065 |
| 10,563,811 | B2 * | 2/2020 | Pei | F16M 11/2085 |
| 10,969,056 | B2 * | 4/2021 | Pei | F16M 11/04 |
| 11,250,730 | B2 * | 2/2022 | Raby | B44C 5/02 |
| 2007/0023593 | A1 * | 2/2007 | Fedewa | F16M 13/02 248/201 |
| 2008/0006751 | A1 | 1/2008 | Chen et al. | |
| 2010/0001153 | A1 * | 1/2010 | Stenhouse | F16M 11/10 248/222.13 |
| 2010/0172072 | A1 * | 7/2010 | Monaco | F16M 11/2014 361/679.01 |
| 2011/0019344 | A1 | 1/2011 | Russell et al. | |
| 2018/0224062 | A1 * | 8/2018 | Yokiel | F16M 11/24 |
| 2021/0254780 | A1 | 8/2021 | Massey | |
| 2021/0332936 | A1 * | 10/2021 | Lyu | F16M 11/18 |
| 2024/0377021 | A1 * | 11/2024 | Orf | F16M 11/2021 |

FOREIGN PATENT DOCUMENTS

| | | | | |
|---|---|---|---|---|
| CN | 117847388 A * | 4/2024 | F16M 11/08 |
| EP | 2077413 A2 * | 7/2009 | F16M 11/10 |
| KR | 20090100693 A * | 9/2009 | H04N 5/655 |
| NL | 9200651 A * | 11/1993 | E05D 5/04 |
| WO | WO-2006127826 A2 * | 11/2006 | F16M 11/10 |
| WO | WO-2009012379 A2 * | 1/2009 | F16M 11/2014 |
| WO | WO-2019134330 A1 * | 7/2019 | F16M 11/2092 |

OTHER PUBLICATIONS

Written Opinion for PCT/US2022/052748, mailed Apr. 25, 2023 (4 pgs).

European Patent Office Communication with Supplementary European Search Report dated Oct. 20, 2025 in corresponding European Patent Application No. 22908339.9, 9 pages.

* cited by examiner

DISPLAY MOUNT WITH ADJUSTABLE WALL ATTACHMENT

RELATED APPLICATIONS

The present application claims priority to PCT Application No. PCT/US2022/052748, entitled DISPLAY MOUNT WITH ADJUSTABLE WALL ATTACHMENT, filed Dec. 13, 2022, and claims the benefit of U.S. Provisional Patent Application No. 63/288,844, entitled DISPLAY MOUNT WITH ADJUSTABLE WALL ATTACHMENT, filed Dec. 13, 2021, which are both hereby fully incorporated herein by reference in their entirety.

TECHNICAL FIELD

The present application relates to mounts for attaching electronic displays to a wall, and more specifically to electronic display mounts adaptable to secure to various configurations of wall structures.

BACKGROUND

Wall mounted electronic displays, such as televisions and monitors, are a common feature in commercial and residential spaces. Wall mounts enabling positioning of a television or monitor relative to the wall are known in the art. Due to the weight of the mount and television, especially for larger televisions, it is desirable to affix the mount to studs within the wall in order to provide for a stable and safe installation. A problem arises, however, in that wall construction is sometimes not standard—for example, studs within the wall may be spaced at the typical 16 or 24 inches on center, but can also be spaced at other non-standard spacings. A drawback of prior art mounts is that it can be difficult to account for non-standard spacings when attaching the mount to the wall, leading to the mount not being secured to studs and a suboptimal installation.

What is needed in the industry is a wall mount for televisions and monitors that addresses the shortcoming of prior art mounts.

SUMMARY

Embodiments of the present invention are directed to a wall mount for televisions and monitors that addresses the shortcomings of prior art devices. In particular, a mount for attaching a flat panel television or monitor to a wall includes a pair of wall attachment brackets adapted to attach to the wall, each wall attachment bracket defining a pair of vertically spaced-apart apertures, a pair of cross bars, each cross bar received through a separate one of the apertures in each wall attachment bracket such that the cross bars are vertically spaced apart and parallel to each other, the cross bars being selectively horizontally slidable in the apertures, an arm coupling assembly operably coupling the cross bars, at least one pivotable arm coupled to the arm coupling assembly, and a display interface operably coupled to the arm. The wall attachment brackets can be secured to wall studs at any spacing the wall studs may happen to have, and the cross-bars can slide in the apertures of the wall attachment brackets to position the arm attachment assembly and arm where desired.

In embodiments, each wall attachment bracket can have a pair of clamps, each clamp disposed proximate a separate one of the spaced-apart apertures and adapted to selectively apply a friction force to the cross bar extending through the aperture to resist sliding of the cross bar. The arm coupling assembly can include at least one vertically oriented pivot tube, the at least one pivotable arm operably coupled to the pivot tube.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
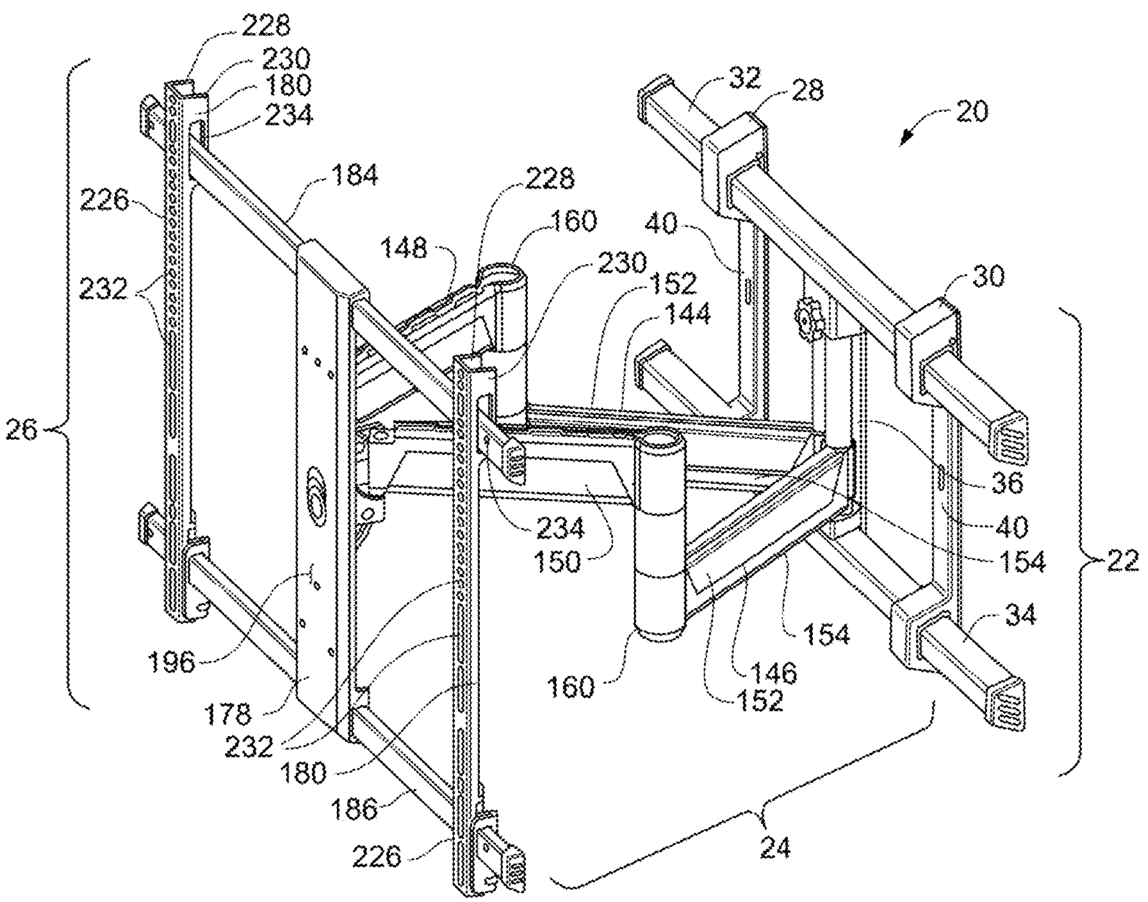
FIG. 1 is a front isometric view of a display mount with adjustable wall attachment according to an embodiment of the invention.
Figure 1A:
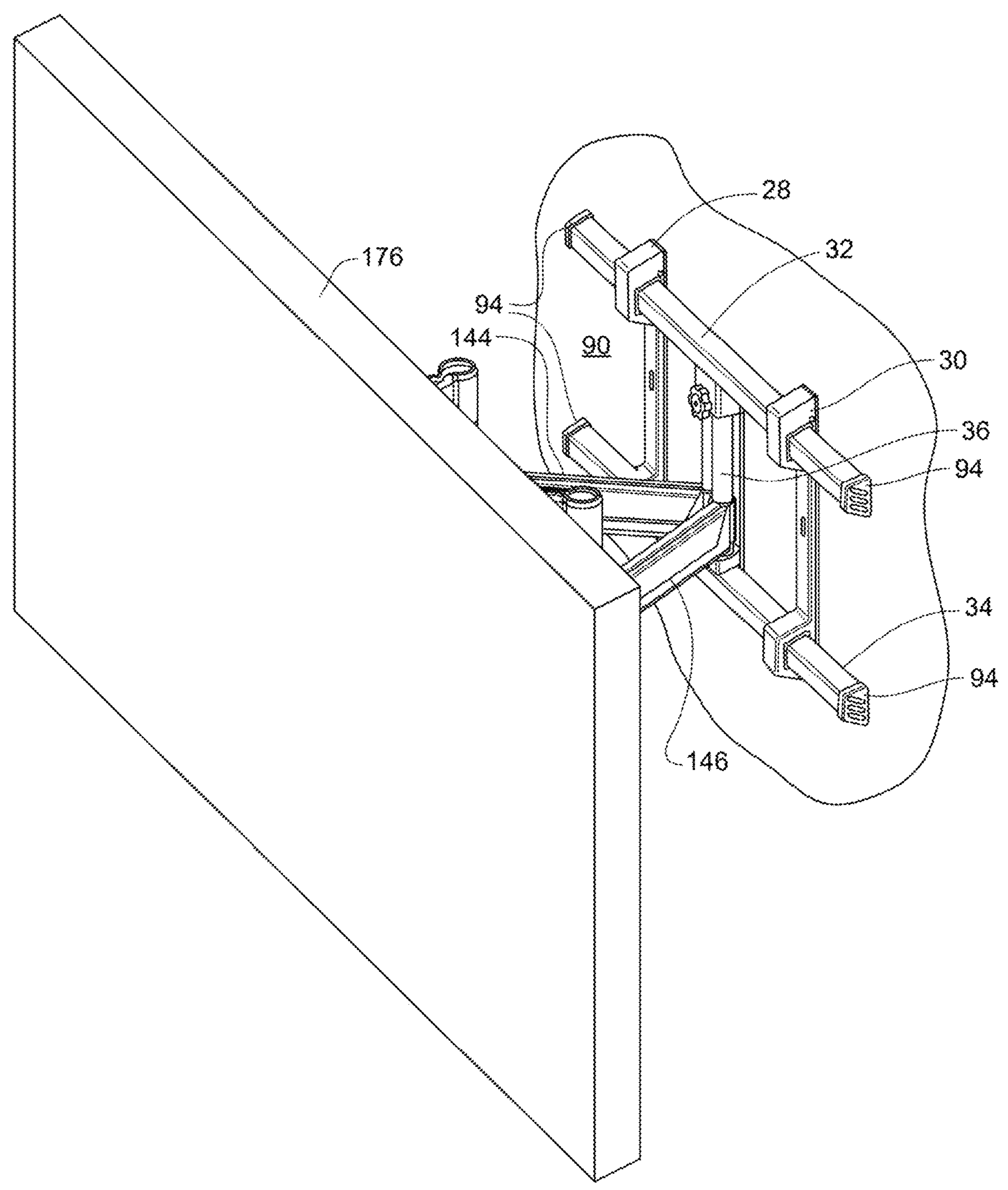
FIG. 1*a* is a front isometric view of the display mount of FIG. 1, with an electronic display device attached, and the mount attached to a wall.
Figure 2:
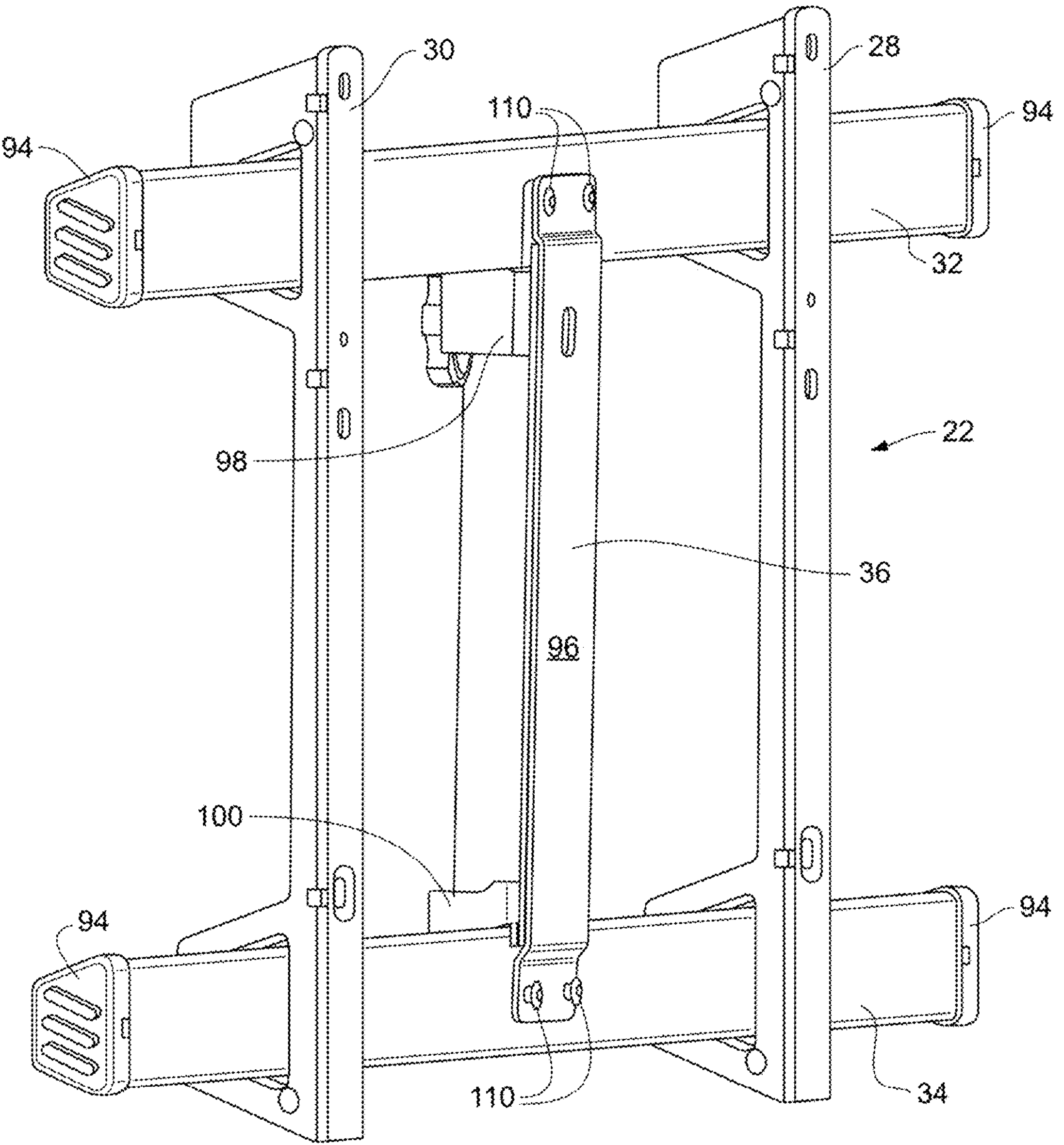
FIG. 2 is a rear isometric view of the wall interface assembly of the mount of FIG. 1.
Figure 3:
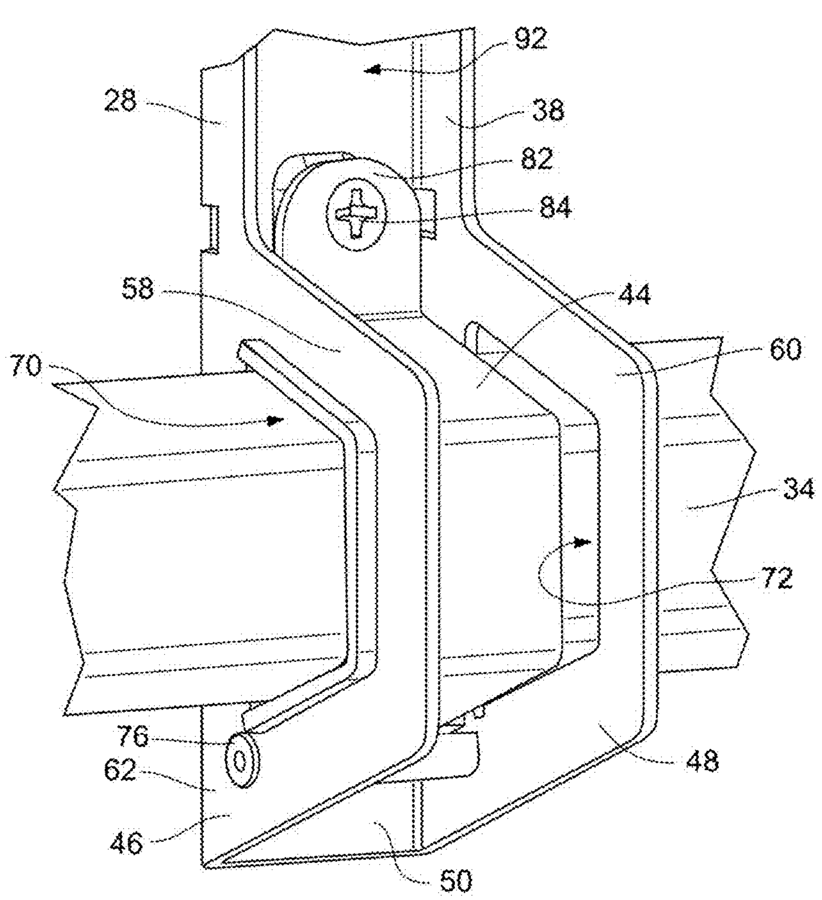
FIG. 3 is a partial front isometric view of a lower wall interface coupling of the wall interface assembly of FIG. 2.
Figure 4:
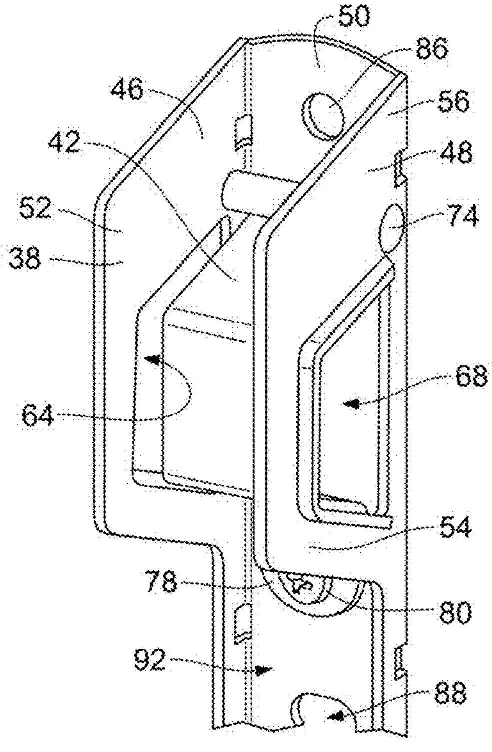
FIG. 4 is a partial front isometric view of an upper wall interface coupling of the wall interface assembly of FIG. 2.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

There is depicted in FIGS. 1-12 display mount with adjustable wall attachment 20 according to embodiments of the invention. Display mount 20 generally includes wall interface assembly 22, arm assembly 24, and display interface assembly 26.

Wall interface assembly 22 generally includes wall attachment brackets 28, 30, cross bars 32, 34, and arm coupling assembly 36. Wall attachment brackets 28, 30, each generally include channel 38, channel cover 40, and clamps 42, 44. Each channel 38 has sidewalls 46, 48, and backplane 50. Side walls 46, 48, have outwardly extending projections 52, 54, at top end 56, and outwardly extending projections 58, 60, at bottom end 62. Projections 52, 54, define apertures 64, 68, and projections 58, 60, define apertures 70, 72. Clamp 42 is pivotally attached between sidewalls 46, 48, with rivet 74, and clamp 44 is pivotally attached between sidewalls 58, 60, with rivet 76. Opposing end 78 of clamp 42 is secured to backplane 50 with fastener 80, and opposing end 82 of clamp 44 is secured to backplane 50 with fastener 84. Backplane 50 defines apertures 86, 88, to receive fasteners (not depicted) to secure channel 38 to wall 90. Channel cover 40 fits between sidewalls 46, 48, to conceal channel recess 92.

Cross bars 32, 34, are slidably received through apertures 64, 68, and 70, 72, respectively. Cross bars 32, 34, have decorative end caps 94.

Arm coupling assembly 36 generally includes backplane 96, upper bushing carrier 98, lower bushing carrier 100, upper bushing 102, lower bushing 104, and arm pivot tubes 106, 108. Backplane 96 is fixed to upper bushing carrier 98, lower bushing carrier 100, and cross bars 32, 34, with rivets 110.

Figure 5:
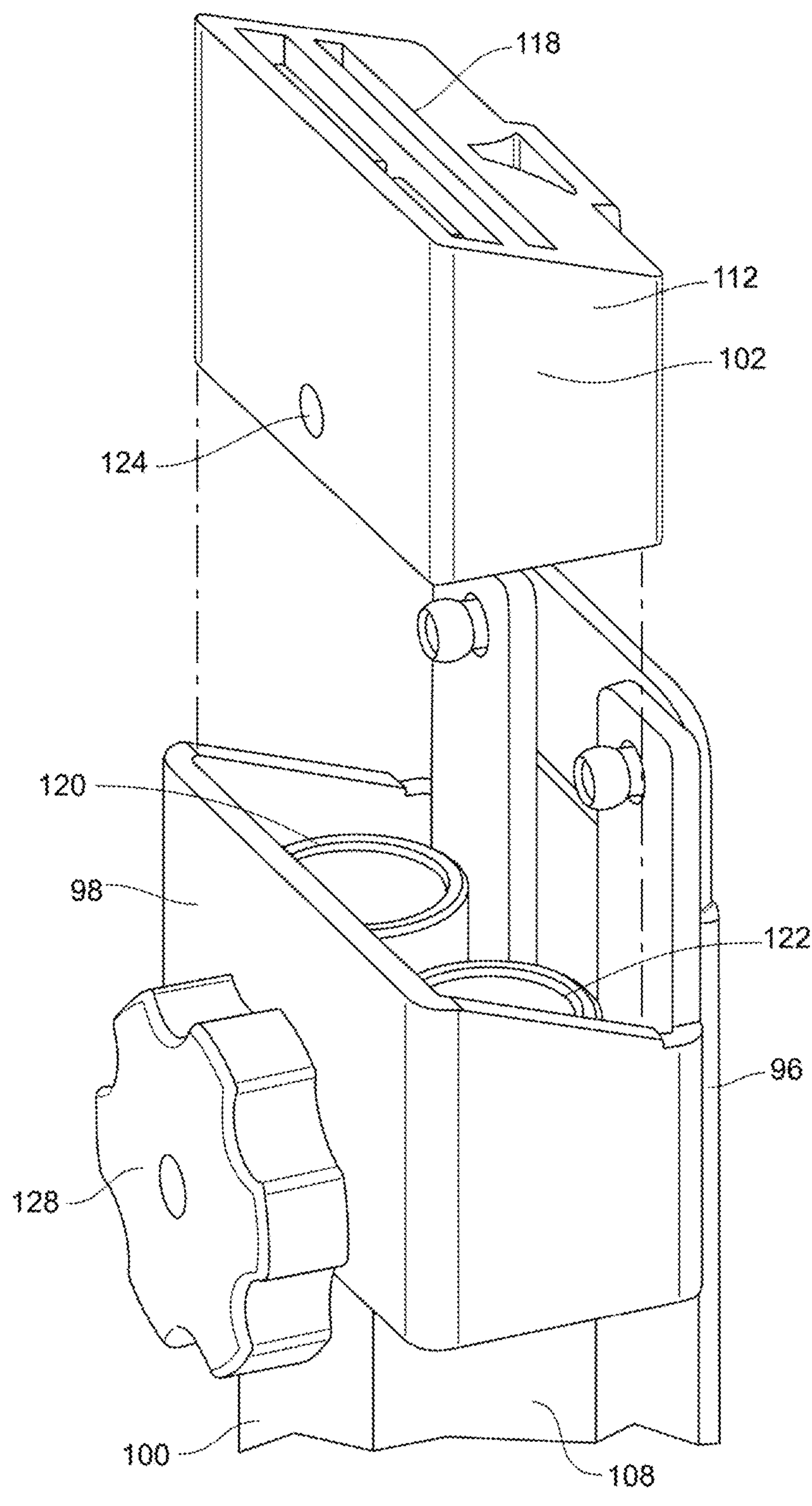
FIG. 5 is a partial exploded view of the upper portion of the pivot assembly of the wall interface assembly of FIG. 2.

Upper bushing 102 has body portion 112 defining cylindrical recesses 114, 116, and longitudinal slot 118. Upper bushing 102 is fitted into upper bushing carrier 98 as depicted in FIG. 5, with upper ends 120, 122, of arm pivot tubes 106, 108, being rotatably received in cylindrical recesses 114, 116, respectively. Body portion 112 also defines bore 124, which receives threaded shaft 126 of friction adjustment knob 128. Nut 130 is disposed on rear side 132 of body portion 112 and is threaded onto threaded shaft 126. As friction adjustment knob 128 is rotated clockwise, body portion 112 is compressed by nut 130 and flexes, narrowing slot 118 and causing cylindrical recesses 114, 116, to fit more tightly around upper ends 120, 122, of arm pivot tubes 106, 108, thereby increasing the amount of friction resisting rotation of arm pivot tubes 106, 108. When friction adjustment knob 128 is rotated counterclockwise, friction is reduced.

Figure 6:
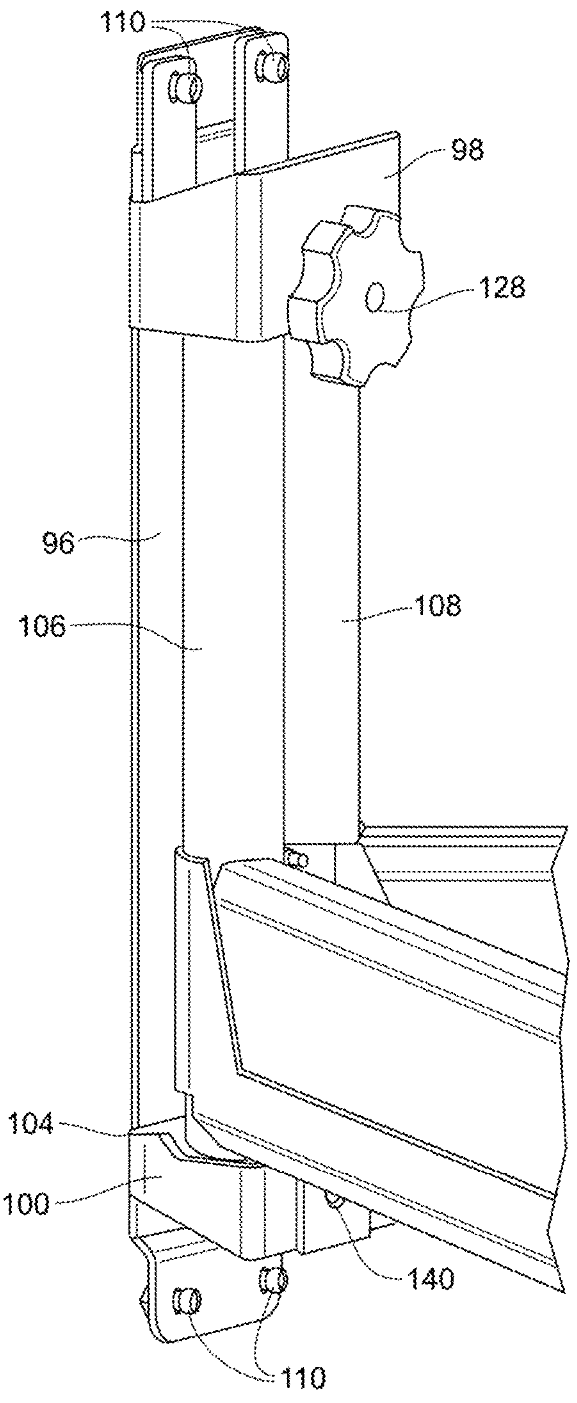
FIG. 6 is an isometric view of the pivot assembly of the wall interface assembly of FIG. 2.
Figure 7:
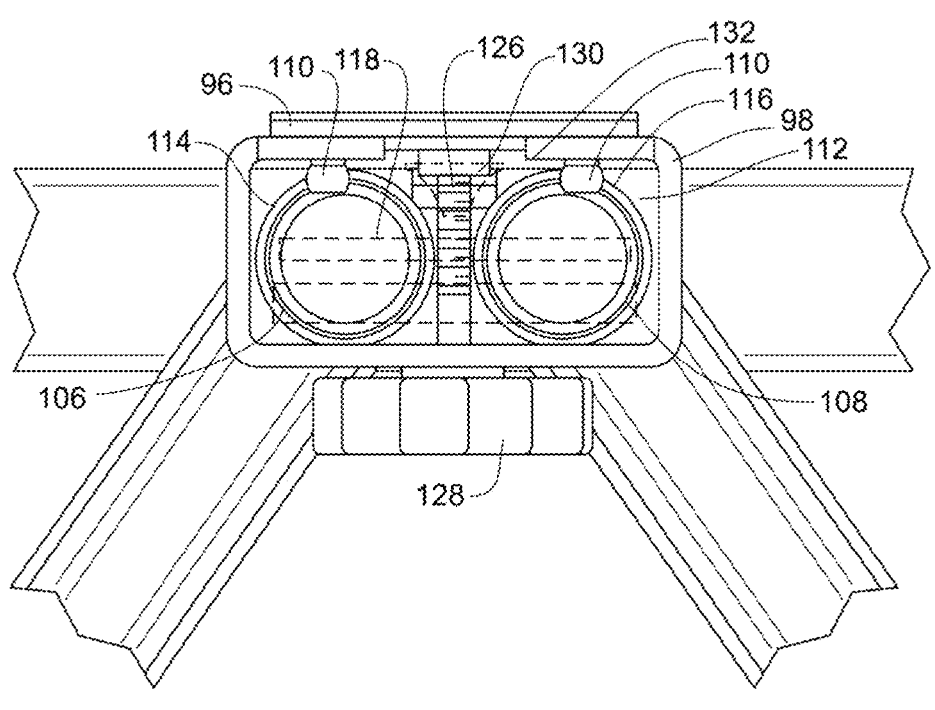
FIG. 7 is a top plan view of the pivot assembly of the wall interface assembly of FIG. 2, with the upper bushing block depicted in phantom for clarity.
Figure 8:
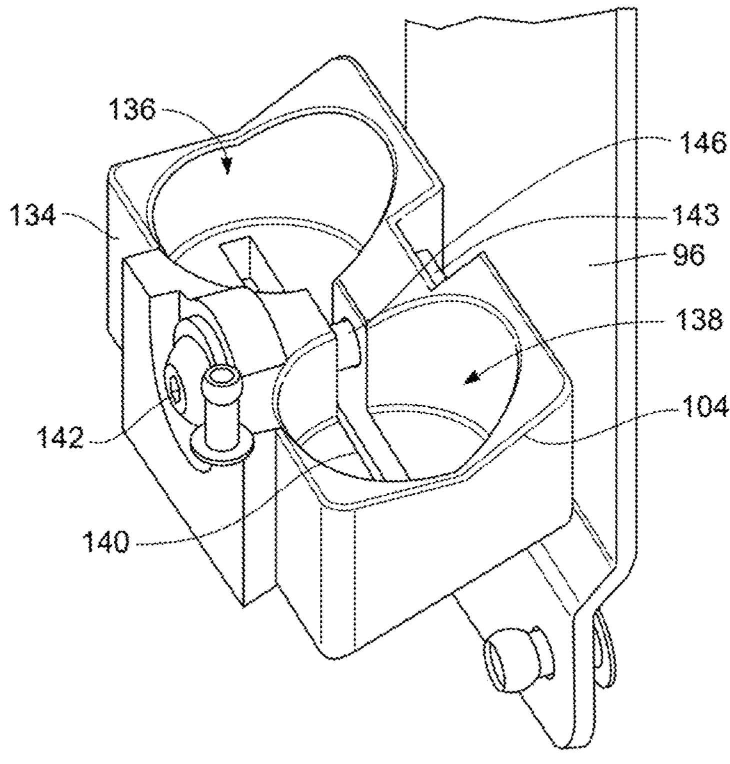
FIG. 8 is a partial front isometric view of the lower bushing block of the wall interface assembly of FIG. 2.

As depicted in FIG. 8 (with lower bushing carrier 100 omitted for clarity), lower bushing 104 has body portion 134 defining cylindrical recesses 136, 138, and longitudinal slot 140. Lower bushing 104 is fitted into lower bushing carrier 100 as depicted in FIG. 6, with lower ends (not depicted) of arm pivot tubes 106, 108, being rotatably received in cylindrical recesses 136, 138. Body portion 134 also defines bore (not depicted), which receives threaded shaft 146 of friction adjustment bolt 142. Nut 143 is disposed on rear side 132 of body portion 134 and is threaded onto threaded shaft 146. As friction adjustment bolt 142 is rotated clockwise, body portion 134 is compressed by nut 143 and flexes, narrowing slot 140 and causing cylindrical recesses 136, 138, to fit more tightly around the lower ends of arm pivot tubes 106, 108, thereby increasing the amount of friction resisting rotation of arm pivot tubes 106, 108. When friction adjustment bolt 142 is rotated counterclockwise, friction is reduced.

It will be appreciated that wall attachment brackets 28, 30, can be attached to wall 90 at locations corresponding to studs in the wall, whether they are located with standard spacing such as 16 or 24 inches, or at a non-standard spacing. Cross bars 32, 34, and arm coupling assembly 36 can then be positioned as desired relative to wall attachment brackets 28, 30, by sliding cross bars 32, 34, in apertures 64, 68, 70, 72, until the desired position is reached. Clamps 42, 44, can then be tightened to secure cross bars 32, 34, in place.

Figure 11:
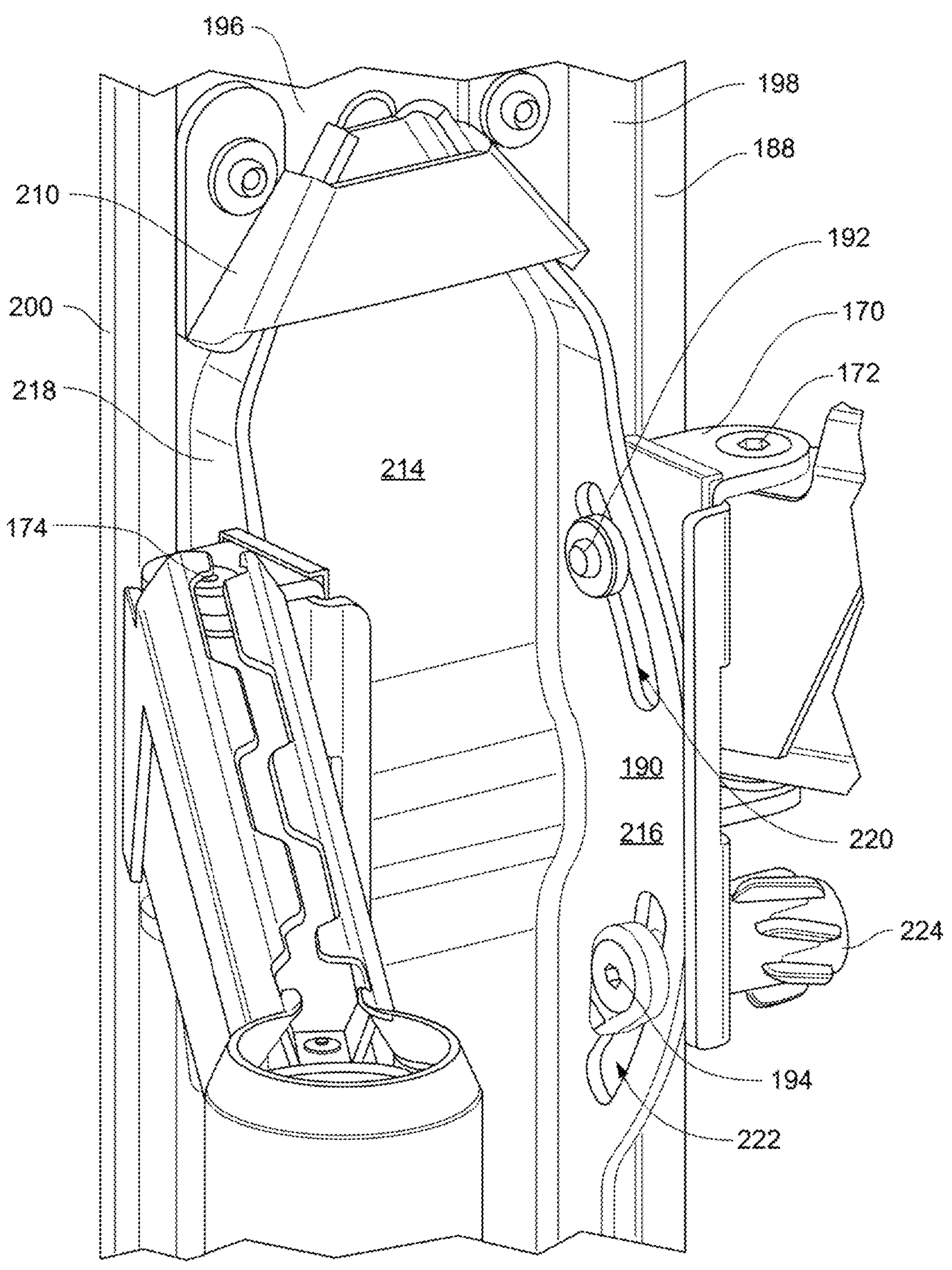
FIG. 11 is a partial rear isometric view of the tilt mechanism of the display interface assembly of FIG. 9.
Figure 13:
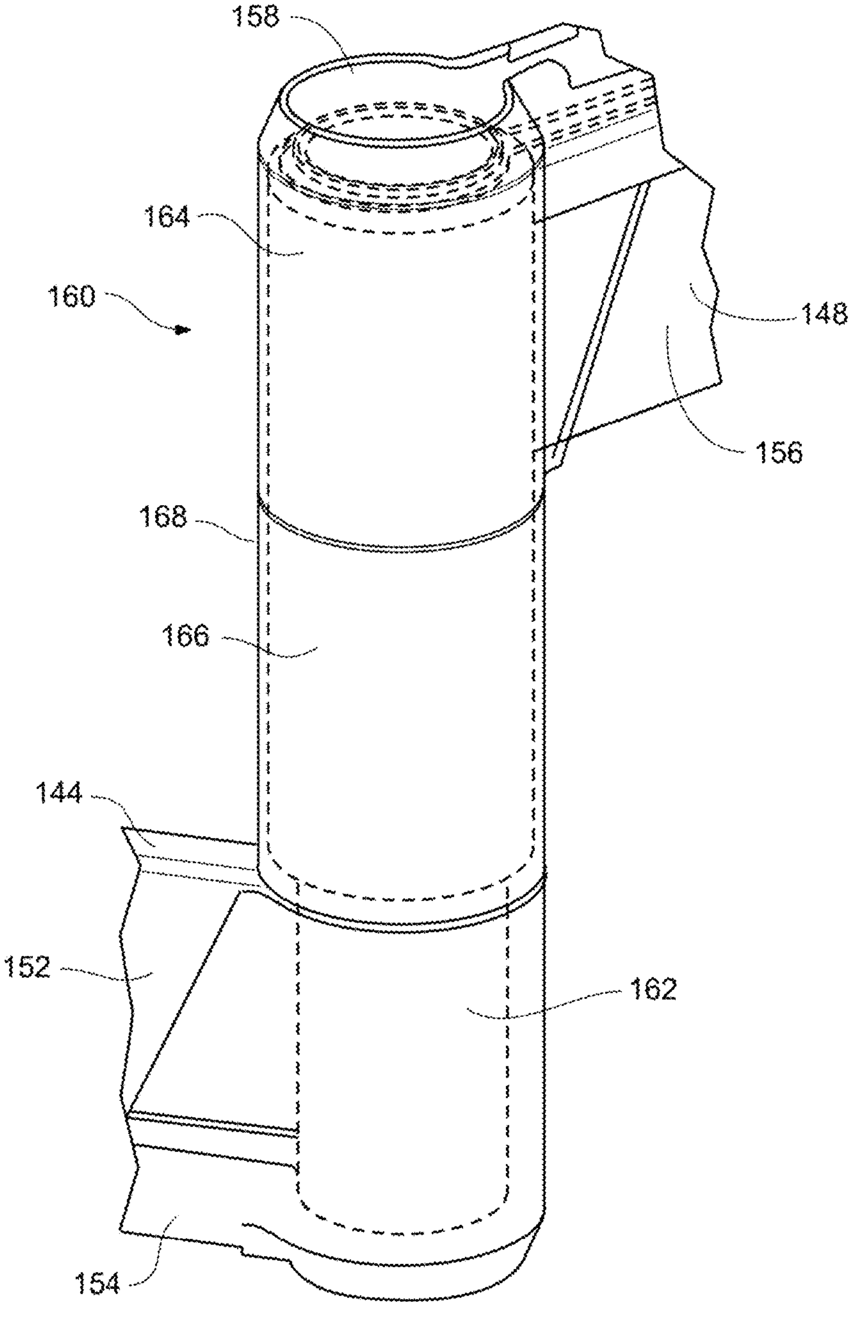
FIG. 13 is a partial isometric view of the pivoting connection between the upper and lower arms of the mount of FIG. 1, with the arm covers depicted in phantom.

Arm assembly 24 generally includes lower arms 144, 146, and upper arms 148, 150. Each of lower arms 144, 146, has a structural arm portion 152, generally made from metal such as steel, and an arm cover 154, generally made from plastic. Each of upper arms 148, 150, has a structural arm portion 156, generally made from metal such as steel, and an arm cover 158, generally made from plastic. Lower arm 144 and upper arm 148 and lower arm 146 and upper arm 150, respectively are coupled together with a pivoting connection 160 as depicted in exemplary fashion in FIG. 13. Structural arm portion 152 of lower arm 144 is fixed to hollow axle tube 162. Structural arm portion 156 of upper arm 148 has bushing portion 164 which rotatably receives hollow axle tube 162. Spacer 166 is fitted around hollow axle tube 162, and has outer decorative cover 168. As depicted in FIG. 11, upper arms 148, 150, are pivotally connected to display interface carrier bracket 170 with pivot pins 172, 174. It will be appreciated that this arrangement enables lower arm 144 and upper arm 148 and lower arm 146 and upper arm 150 to articulate about hollow axle tubes 162, and pivot about arm pivot tubes 106, 108, and pivot pins 172, 174, such that display interface assembly 26, and an attached television or monitor 176, can be positioned closer to or further away from wall 90, shifted laterally from side-to-side, or angled relative to wall 90.

It will be further appreciated that any wires or cables necessary for supplying power or signal to television or monitor 176 can be managed or concealed by routing them through arm covers 154, 158, and hollow axle tube 162.

Display interface assembly 26 generally includes tilt assembly 178, display mounting brackets 180, 182, and support bars 184, 186. Tilt assembly 178 generally includes tilt interface channel 188, tilt guide bracket 190, upper guide pins 192, and lower guide pins 194. Tilt interface channel 188 has front wall 196 and rearwardly projecting sidewalls 198, 200. Sidewalls 198, 200, define apertures 202, 204, and apertures 206, 208, respectively receiving support bars 184, 186, therethrough.

Figure 10:
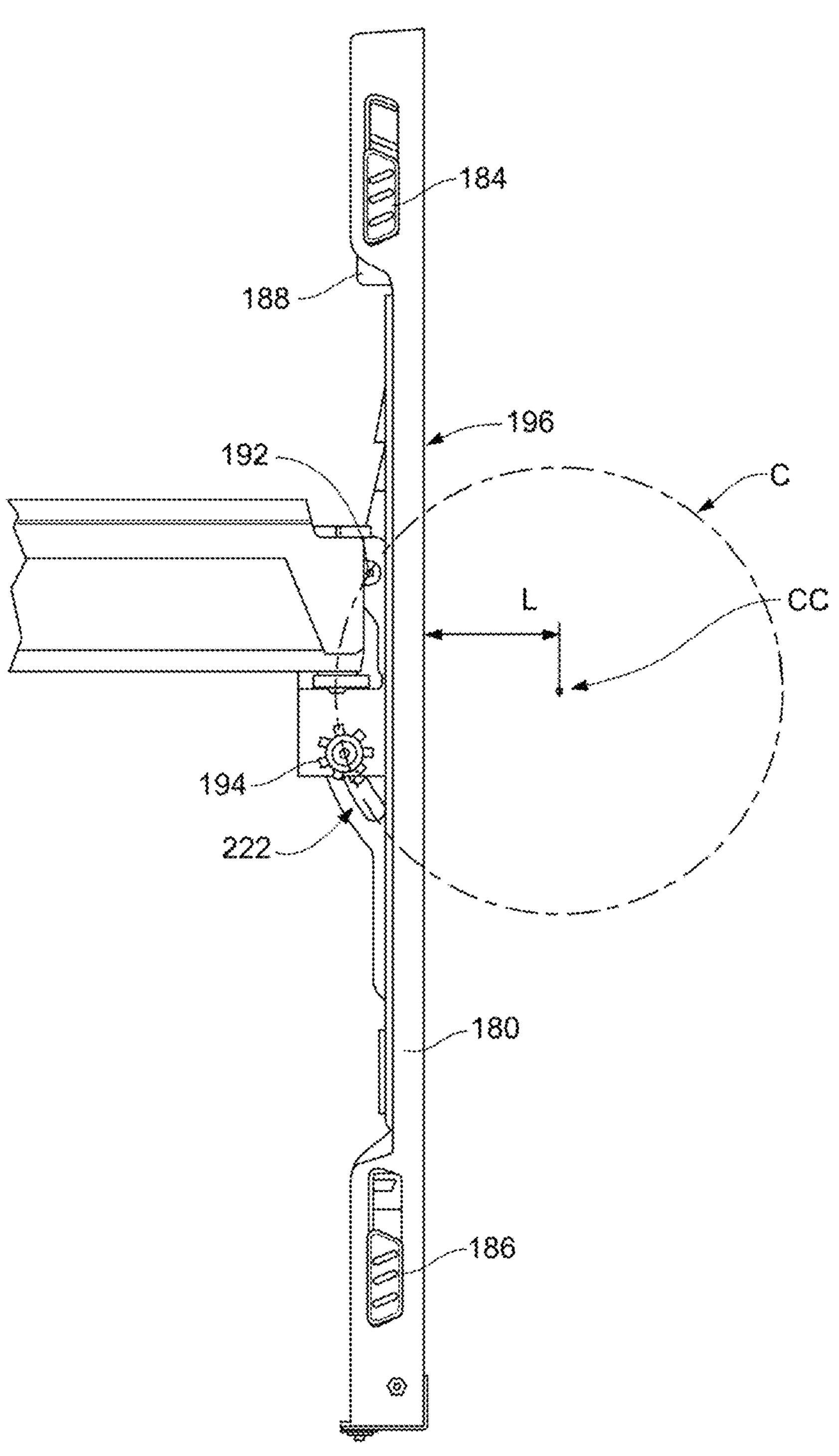
FIG. 10 is a right elevation view of the display interface assembly, depicting the display tilt feature of the mount.

Tilt guide bracket 190 is fixed to front wall 196 of tilt interface channel 188 with clips 210, 212, and has front wall 214 and rearwardly projecting sidewalls 216, 218. Each of sidewalls 216, 218, defines an upper guide slot 220, and a lower guide slot 222. As depicted in FIG. 10, upper guide slots 220 and lower guide slots 222 are positioned along the circumference of a circle C having a center CC positioned forwardly by distance L from front wall 196 of tilt interface channel 188. It will be appreciated that the size of circle C and the orientation of slots 220, 222, can be selected so as to give any desired distance L. Preferably, distance L is selected so that center CC is disposed within a television or monitor 176 attached to the mount. Upper guide pins 192 extend through upper guide slots 220 and slide or roll therein. Similarly, lower guide pins 194 extend through lower guide slots 222 and slide or roll therein. Any of guide pins 192, 194, may be selectively tightened or loosened with an optional friction control knob 224 to add or reduce friction that resists movement of guide pins 192, 194, in slots 220, 222.

Figure 9:
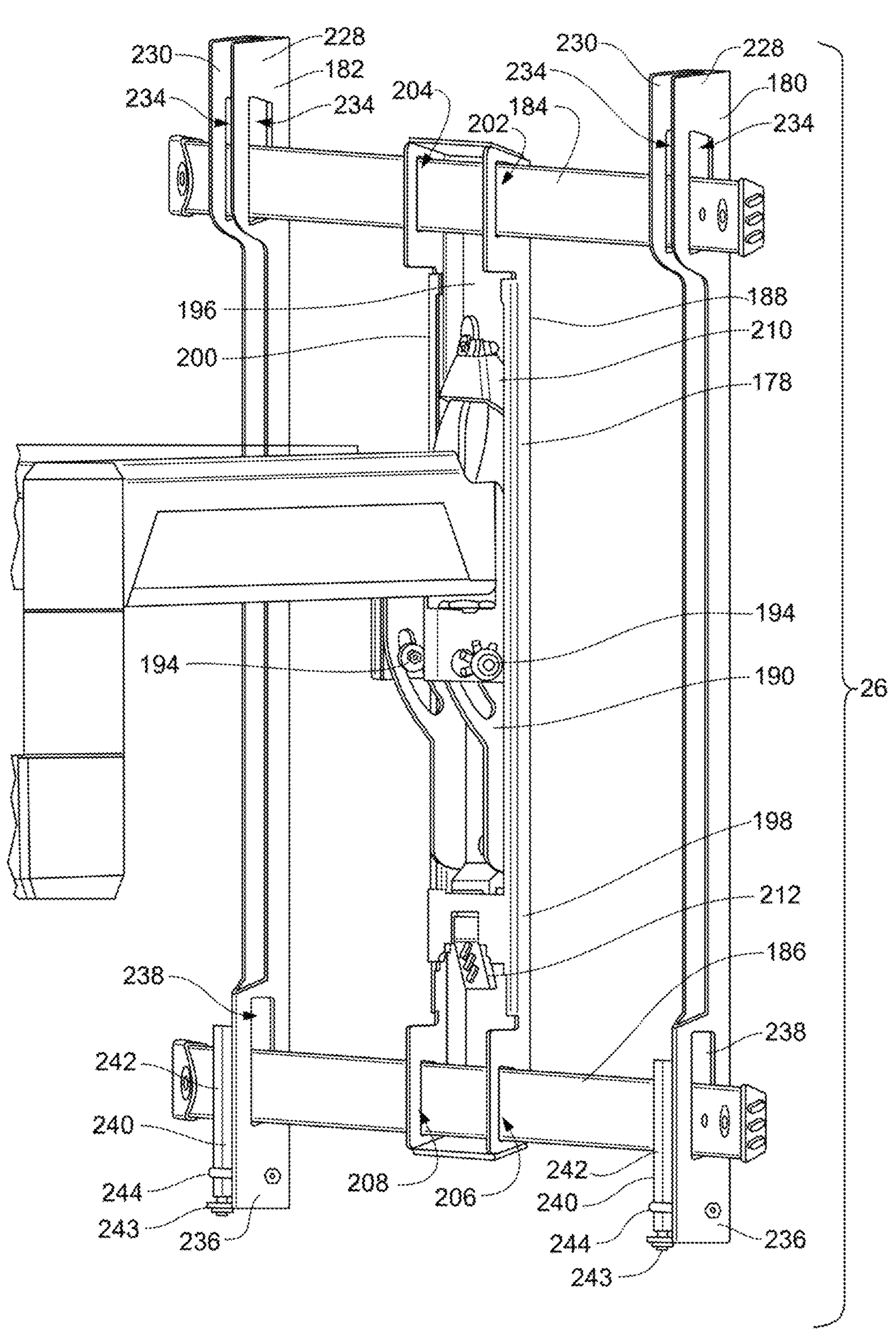
FIG. 9 is a rear isometric view of the display interface assembly of the display mount of FIG. 1.
Figure 12:
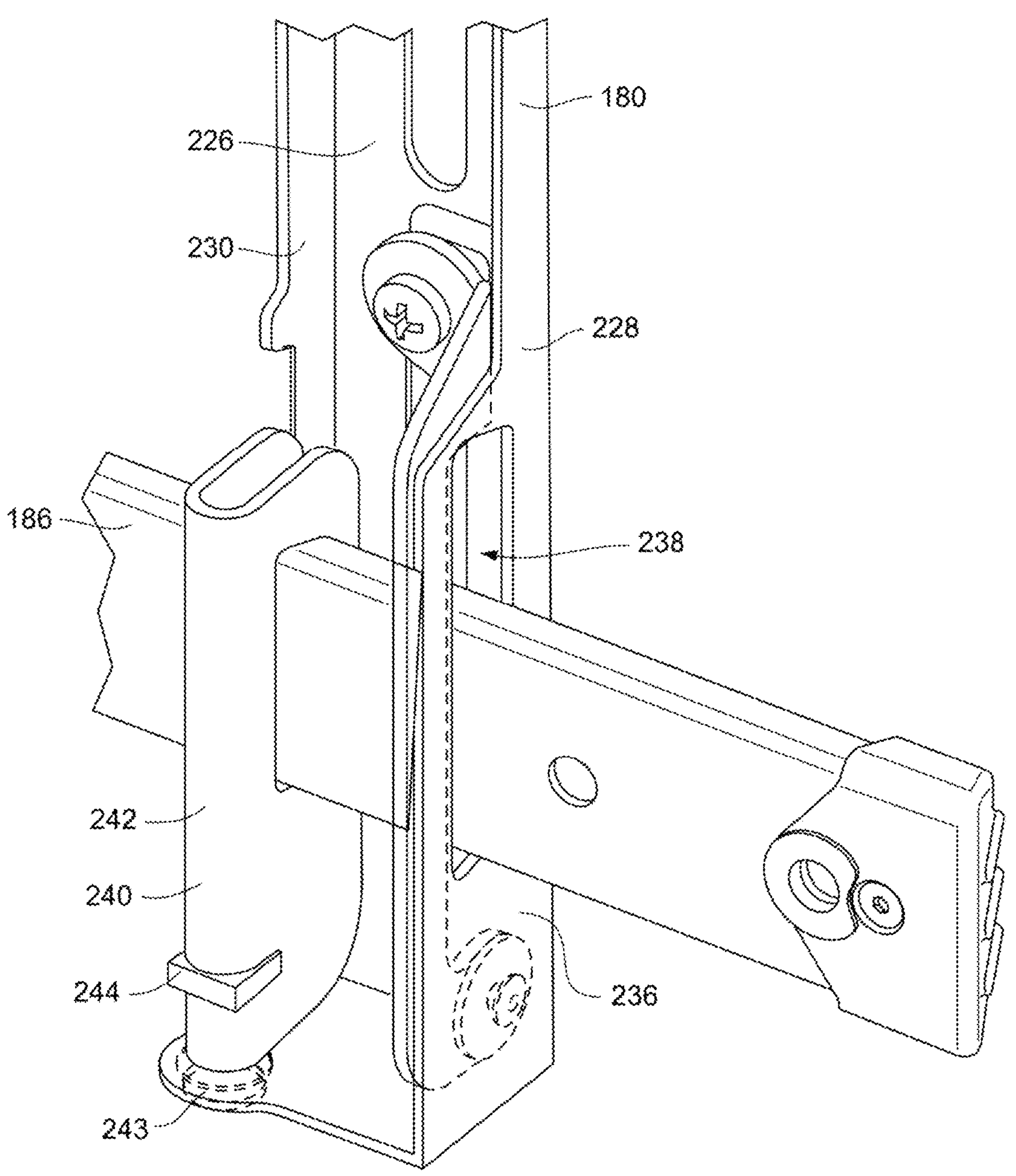
FIG. 12 is a partial rear isometric view of the display height adjustment mechanism of the display interface assembly of FIG. 9.

Each of display mounting brackets 180, 182, has a front wall 226 with rearwardly projecting sidewalls 228, 230. Front wall 226 defines apertures 232 for receiving fasteners (not depicted) to attach television or monitor 176. Sidewalls 228, 230, define upper elongated apertures 234. Support bar 184 is received through apertures 234. As depicted in FIGS. 9 and 12, proximate bottom end 236 of each of display mounting brackets 180, 182, sidewall 228 defines lower elongate apertures 238. Support bar 186 is received through apertures 238. Vertical height adjustment assembly 240 generally includes U-shaped bracket 242, threaded bolt 243, and adjustment nut 244. U-shaped bracket 242 is fixed to support bar 186 and is slidable on sidewall 230. Adjustment nut 244 is threaded onto threaded bolt 243. As threaded bolt 243 is rotated, adjustment nut 244 translates, causing U-shaped bracket 242 to move upward or downward. Thereby, each display mounting bracket 180, 182, can be shifted upwardly or downwardly relative to support bars 184, 186, to individually vertically position display mounting brackets 180, 182, and an attached television or monitor 176. It will be appreciated that individual adjustment of vertical height adjustment assemblies 240 can also permit vertical skewing (different left and right-side height) of the television or monitor 176 if desired.

In use, wall attachment brackets 28, 30, can be affixed to studs in a wall 90 to match the spacing of the studs, whether standard spacing such as 16 or 24 inches, or a non-standard spacing. Cross bars 32, 34, can be shifted relative to wall attachment brackets 28, 30, to achieve the desired lateral positioning on the wall 90. Clamps 42, 44, can then be tightened to inhibit further shifting of cross bars 32, 34. Display mounting brackets 180, 182, can be attached to the rear side of television or monitor 176, and coupled to support bars 184, 186. Display mounting brackets 180, 182, can be positioned laterally along support bars 184, 186, equidistant from tilt assembly 178 to match the spacing of attachment points on television or monitor 176. Vertical height adjustment assemblies 240 can be adjusted to shift the position of television or monitor 176 vertically or to skew the display if desired. The television or monitor 176 can be tilted about a virtual horizontal axis passing through center CC of circle C. This tilting motion is more fully described in U.S. Pat. No. 6,905,101, owned by the owners of the present invention and hereby fully incorporated herein by reference.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A mount for attaching a flat panel television or monitor to a wall, comprising:

- a pair of wall attachment brackets adapted to attach to the wall, each wall attachment bracket defining a pair of vertically spaced-apart apertures;
- a pair of cross bars, each cross bar received through a separate one of the apertures in each wall attachment bracket such that the cross bars are vertically spaced apart and parallel to each other, the cross bars being selectively horizontally slidable in the apertures;
- an arm coupling assembly operably coupling the cross bars, wherein the arm coupling assembly includes
  - a backplane;
  - an upper bushing defining at least one first cylindrical recess;
  - a lower bushing defining at least one second cylindrical recess;
  - at least one vertically oriented hollow pivot tube presenting a pair of opposing ends, a first one of the pair of opposing ends rotatably received in the at least one first cylindrical recess and a second one of the pair of opposing ends rotatably received in the at least one second cylindrical recess so that the at least one vertically oriented hollow pivot tube is rotatable relative to the backplane; and
  - a friction adjustment control operably coupled with the backplane and arranged to control friction inhibiting pivoting of the at least one vertically oriented pivot tube;
- at least one pivotable arm operably coupled to the at least one vertically oriented pivot tube such that the at least one pivotable arm pivots with rotation of the at least one vertically oriented pivot tube; and
- a display interface operably coupled to the arm, the display interface adapted to attach to the flat panel television or monitor.

2. The mount of claim 1, wherein each wall attachment bracket has a pair of clamps, each clamp disposed proximate a separate one of the spaced-apart apertures and adapted to selectively apply a friction force to the cross bar extending through the aperture to resist sliding of the cross bar.

3. The mount of claim 1, wherein the mount includes a pair of pivotable arms operably coupled to the arm coupling assembly and wherein:

the upper bushing defines a pair of first cylindrical recesses;

the lower bushing defines a pair of second cylindrical recesses; and the arm coupling assembly includes a pair of vertically oriented hollow pivot tubes, each one of the pair of vertically oriented hollow pivot tubes presenting a pair of opposing ends, a first one of the pair of opposing ends of each vertically oriented hollow pivot tube being rotatably received in a separate one of the first cylindrical recesses, a second one of the pair of opposing ends of each vertically oriented hollow pivot tube being rotatably received in a separate one of the second cylindrical recesses, so that each of the vertically oriented hollow pivot tubes is rotatable relative to the backplane, each of the pivotable arms operably coupled to a separate one of the pair of hollow pivot tubes.

4. The mount of claim 3, wherein the friction adjustment control is arranged to simultaneously control friction inhibiting pivoting of both of the pair of vertically oriented hollow pivot tubes.

5. The mount of claim 1, wherein the at least one pivotable arm comprises an arm assembly including an upper arm and a lower arm, the upper arm and the lower arm pivotally coupled together so that the at least one pivotable arm articulates, the at least one pivotable arm having a first end pivotally coupled to the arm coupling assembly and having a second opposing end pivotally coupled to the display interface.

6. The mount of claim 1, wherein the mount comprises a pair of pivotable arms, each pivotable arm comprising an arm assembly including an upper arm and a lower arm, the upper arm and the lower arm pivotally coupled together so that the pivotable arm articulates, each pivotable arm having a first end pivotally coupled to the arm coupling assembly and having a second opposing end pivotally coupled to the display interface.

7. The mount of claim 1, wherein the display interface includes a tilt assembly adapted to enable tilting of the flat panel television or monitor attached to the display interface.

8. The mount of claim 7, wherein the tilt assembly enables tilting of the flat panel television or monitor about a generally horizontal tilt axis spaced apart forwardly from the display interface.

9. The mount of claim 1, wherein the display interface comprises a pair of spaced apart horizontally oriented support bars and a pair of spaced apart vertically oriented display mounting brackets, each of the display mounting brackets operably coupled to one of the support bars with a separate vertical height adjustment assembly, the vertical height adjustment assemblies enabling selective vertical shifting of the display mounting bracket relative to the support bars.

10. The mount of claim 1, wherein the arm coupling assembly further comprises an upper bushing carrier receiving the upper bushing and a lower bushing carrier receiving the lower bushing.

11. The mount of claim 10, wherein the friction adjustment control comprises a threaded shaft arranged so that rotation of the threaded shaft causes compression of the upper or lower bushing, thereby applying friction resisting rotation of the at least one vertically oriented hollow pivot tube.

12. A mount for attaching a flat panel television or monitor to a wall, comprising:

a pair of wall attachment brackets adapted to attach to the wall, each wall attachment bracket defining a pair of vertically spaced-apart apertures;

a pair of cross bars, each cross bar received through a separate one of the apertures in each wall attachment bracket such that the cross bars are vertically spaced apart and parallel to each other, the cross bars being selectively horizontally slidable in the apertures;

an arm coupling assembly operably coupling the cross bars, wherein the arm coupling assembly includes a backplane;

an upper bushing defining a pair of first cylindrical recesses;

a lower bushing defining a pair of second cylindrical recesses;

a pair of vertically oriented hollow pivot tubes, each one of the pair of vertically oriented hollow pivot tubes presenting a pair of opposing ends, a first one of the pair of opposing ends of each vertically oriented hollow pivot tube being rotatably received in a separate one of the first cylindrical recesses, a second one of the pair of opposing ends of each vertically oriented hollow pivot tube being rotatably received in a separate one of the second cylindrical recesses, so that each vertically oriented pivot tube is separately rotatable relative to the backplane; and a friction adjustment control operably coupled with the backplane and arranged to simultaneously control friction inhibiting pivoting of both of the vertically oriented hollow pivot tubes;

a pair of articulating arm assemblies, each articulating arm assembly operably coupled to a separate one of the vertically oriented hollow pivot tubes of the arm coupling assembly such that each articulating arm assembly pivots with rotation of the respective vertically oriented hollow pivot tube; and a display interface operably coupled to the articulating arm assemblies, the display interface adapted to receive the flat panel television or monitor.

13. The mount of claim 12, wherein each wall attachment bracket has a pair of clamps, each clamp disposed proximate a separate one of the spaced-apart apertures and adapted to selectively apply a friction force to the cross bar extending through the aperture to resist sliding of the cross bar.

14. The mount of claim 12, wherein the display interface includes a tilt assembly adapted to enable tilting of the flat panel television or monitor received on the display interface.

15. The mount of claim 14, wherein the tilt assembly enables tilting of the flat panel television or monitor about a generally horizontal tilt axis spaced apart forwardly from the display interface.

16. The mount of claim 12, wherein the display interface comprises a pair of spaced apart horizontally oriented support bars and a pair of spaced apart vertically oriented display mounting brackets, each of the display mounting brackets operably coupled to one of the support bars with a separate vertical height adjustment assembly, the vertical height adjustment assemblies enabling selective vertical shifting of the display mounting bracket relative to the support bars.

17. The mount of claim 12, wherein the arm coupling assembly further comprises an upper bushing carrier receiving the pair of upper bushings and a lower bushing carrier receiving the pair of lower bushings.

18. The mount of claim 17, wherein the friction adjustment control comprises a threaded shaft arranged so that rotation of the threaded shaft causes compression of the upper or lower bushings, thereby applying friction resisting rotation of the vertically oriented hollow pivot tubes.

19. An electronic display system, the system comprising:

an electronic display comprising a flat panel television or monitor;

a mount for attaching the electronic display to a wall, comprising:

a pair of wall attachment brackets adapted to attach to the wall, each wall attachment bracket defining a pair of vertically spaced-apart apertures;

a pair of cross bars, each cross bar received through a separate one of the apertures in each wall attachment bracket such that the cross bars are vertically spaced apart and parallel to each other, the cross bars being selectively horizontally slidable in the apertures;

an arm coupling assembly operably coupling the cross bars, wherein the arm coupling assembly includes a backplane;

an upper bushing defining a pair of first cylindrical recesses;

a lower bushing defining a pair of second cylindrical recesses;

a pair of vertically oriented hollow pivot tubes, each one of the pair of vertically oriented hollow pivot tubes presenting a pair of opposing ends, a first one of the pair of opposing ends of each vertically oriented hollow pivot tube being rotatably received in a separate one of the first cylindrical recesses, a second one of the pair of opposing ends of each vertically oriented hollow pivot tube being rotatably received in a separate one of the second cylindrical recesses, so that each vertically oriented pivot tube being is separately rotatable relative to the backplane; and a friction adjustment control operably coupled with the backplane and arranged to simultaneously control friction inhibiting pivoting of both of the vertically oriented hollow pivot tubes;

a pair of articulating arm assemblies, each articulating arm assembly operably coupled to a separate one of the vertically oriented hollow pivot tubes of the arm coupling assembly such that each articulating arm assembly pivots with rotation of the respective vertically oriented hollow pivot tube; and a display interface operably coupled to the articulating arm assemblies and attached to the electronic display.

20. The system of claim 19, wherein the display interface includes a tilt assembly adapted to enable tilting of the electronic display.

* * * * *